United States Patent
Hult

[11] 3,906,584
[45] Sept. 23, 1975

[54] VACUUM CLEANER WITH DIVIDED DISCHARGE

[75] Inventor: David R. Hult, Columbus, Ind.

[73] Assignee: Vernco Corporation, Columbus, Ind.

[22] Filed: Nov. 23, 1973

[21] Appl. No.: 418,560

[52] U.S. Cl. .............. 15/347; 415/144; 417/423 A
[51] Int. Cl.² ........................................... A47L 5/14
[58] Field of Search ...... 15/330, 346, 347; 415/144; 417/423 A

[56] References Cited
UNITED STATES PATENTS
2,064,587   12/1936   Carlstedt.......................... 15/347 X FOREIGN PATENTS OR APPLICATIONS
155,101   9/1932   Switzerland.......................... 15/330
1,126,571   3/1962   Germany .............................. 15/330

Primary Examiner—Peter Feldman
Assistant Examiner—Philip R. Coe
Attorney, Agent, or Firm—William R. Coffey

[57] ABSTRACT

A vacuum cleaner having a blower feature as well as a pickup feature, the cleaner comprising a tank having an interior space for receiving dirt and debris, a blower assembly mounted on the tank and comprising a housing defining an interior space in communication with the interior space of the tank through an inlet passage, and a motor-driven blower for moving air from the tank through the inlet passage into the housing. The housing provides a discharge port proportioned and constructed such that a blower hose can be connected thereto, and said housing also provides discharge vents for its said interior space, the discharge vents being in addition to and separate from the discharge port. The discharge vents or bleed-off vents are proportioned to bleed off from approximately 60 to 80% of the air drawn through the inlet passage. The bleed-off vents extend about substantially the whole peripheral extent of the blower housing, the vents being axially relatively narrow and considerably less in axial depth than the axial depth of the interior space of the blower housing. The blower includes a centrifugal blower wheel with a center opening such that it delivers air radially outwardly toward the said bleed-off vents.

14 Claims, 3 Drawing Figures

US Patent  Sept. 23,1975  3,906,584
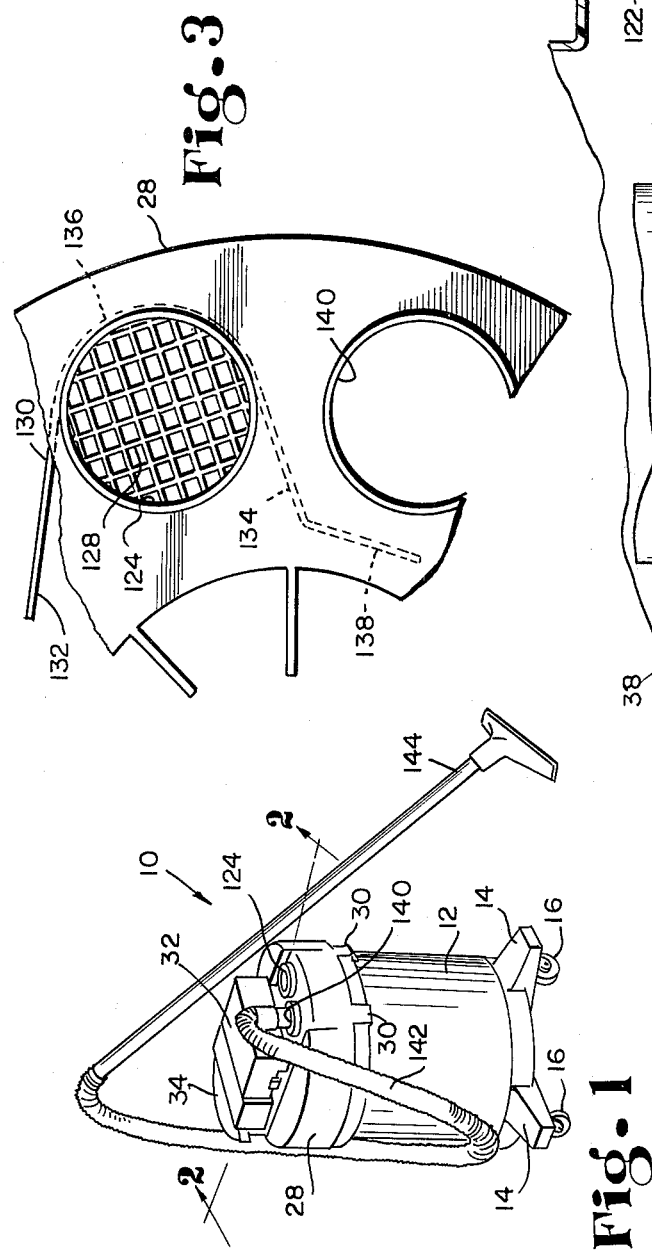
Fig-3
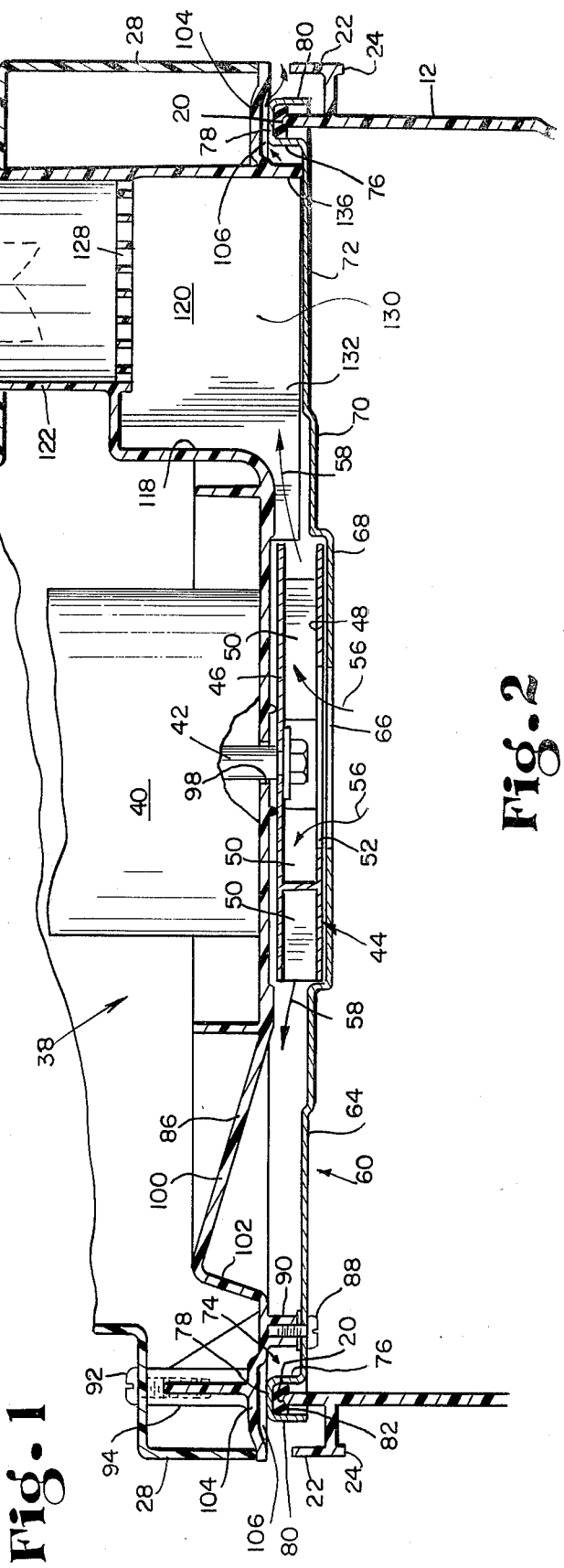
Fig-1
Fig-2

VACUUM CLEANER WITH DIVIDED DISCHARGE

The present invention relates to vacuum cleaners, and more particularly to the provision of a vacuum cleaner having a blower feature as well as a pickup feature with increased pickup capability.

It is conventional to provide vacuum cleaners which include a blower discharge port to which the conventional flexible hose can be attached so that the vacuum cleaner can be used as a blower. A vacuum cleaner rigged in such a manner may be used to blow sawdust and other such debris off workbenches, implements and the like onto the floor so that the cleaner can be used in its usual mode to pick up the sawdust and debris from the floor.

The present invention constitutes an improvement over the prior art by providing such a vacuum cleaner with the blower feature, but with improved pickup capacity. Such an advantageous combination is achieved, in accordance with the present invention, by dividing the discharge of the air from the blower assembly of the vacuum cleaner, discharging from approximately 20 to 40% through the discharge port to which the blower hose can be attached and discharging from approximately 60 to 80% of the air through bleed-off vents spaced peripherally about the blower assembly. The bleed-off vents and the discharge port, or discharge ferrule as it is sometimes called, are proportioned and designed to strike a balance between the vents and the blowing discharge port without creating turbulence in either branch of the two discharge paths. The bleed-off vents result in a 25% greater air flow through the system by reducing the back pressure on the blower wheel itself. By using bleed-off vents which are axially relatively narrow or relatively short in depth as compared to the axial depth of the interior of the blower housing and which are extending peripherally substantially the entire distance about the blower housing, substantial improvements in air flow are obtained. The axial depth of the bleed-off vents may be, for instance, only 0.050 inch. Such vents may extend about a blower housing which is approximately 15 inches in diameter. There may be a plurality of such vents separated only by ribs which are quite narrow in peripheral extent, only approximately 0.10 inch to 0.125 inch.

The axially narrow bleed-off vents of the present invention are in contrast, for instance, to the fewer number of slots with a greater axial depth shown in U.S. Pat. No. 3,730,642 issued May 1, 1973 (U.S. CL. 417–424, 415–180, 415–219, 310–62). Reference is made to the said prior U.S. Pat. No. 3,730,642 and the patent references cited therein. The blower wheel of the present invention may preferably be of the type shown in U.S. Pat. No. 3,730,642, the blower wheel being a backwardly-curved centrifugal blower wheel with center opening. Within the above-said 15 inch diameter blower housing, such a blower wheel which is only approximately 5 inches in diameter may ideally be used. Thus, the bleed-off vents which are spaced about the outer periphery of the blower housing are spaced a considerable distance from the outer diameter of the blower wheel, i.e., approximately 5 inches. This is in contrast to prior art systems such as that shown in U.S. Pat. No. 3,730,642 wherein the discharge vents are spaced relatively close to the outer diameter of the blower wheel. Of course, U.S. Pat. No. 3,730,642 does not contemplate a blowing feature, all of the air being discharged through the vents about the periphery of the blower wheel.

It is necessary to provide only approximately 20 to 40 CFM for blowing purposes, i.e., for dusting things off. The blower wheel in the vacuum cleaner is capable of moving, for instance, 125 CFM at wide open speed and with no obstructions to its intake. Thus, only a small portion of the air moving capacity of the blower wheel is actually needed for most blowing purposes. Preferably, therefore, the blower housing of the present invention is proportioned and constructed such that 20 to 40% of the total CFM is discharged through the blowing port while the rest of the air, i.e., from approximately 60 to 80%, is bled off through the bleed-off vents disposed about the outer periphery of the blower housing. The discharge port to which the hose can be connected is in the upper wall of the blower housing and spaced radially inwardly from its outer peripheral edge portion where the bleed-off vents are positioned. A generally U-shaped shield extends downwardly from that upper wall to have its leg sections extending toward the blower wheel to direct the proper portion of the air to the discharge port.

An object of the present invention, therefore, is to provide a vacuum cleaner with a blowing feature and with an improved pickup capacity created by the provision of peripherally extending bleed-off vents in the blower housing. The improved pickup capacity is created by increasing the air flow through the system by as much as 25%. It is the increased air flow which permits the picking up of heavier objects. The system of the present invention is limited only by the size of the hose in picking up objects. That is, objects which can move through the hose can be picked up by the cleaner of the present invention.

It is an object of the present invention to reduce the back pressure by bleeding off approximately 60 to 80% of the air moving through the blower wheel, directing the rest of the air through a discharge port used for blowing purposes. One embodiment of the present invention using a motor which develops approximately one horsepower peak and a blower wheel capable of delivering 125 CFM at 25000 RPM with no obstruction to its intake will out-perform conventional vacuum cleaners with similar motors and blower wheels by a factor of 20%. Yet, the vacuum cleaner of the present invention will provide the required blowing feature which is a must for optimum usage of such a vacuum cleaner.

It is possible to remove all back pressure upon such a blower wheel and, perhaps, obtain as much as 140 CFM at top speed just by removing all obstructions to the movement of the air radially outwardly from the blower wheel. By using the bleed-off vents designed in accordance with the present invention, an air flow of approximately 125 CFM through the blower wheel can be achieved and still obtain 20 to 40% of that air flow for discharge through a port to which a hose can be attached. The air flow through the total vacuum cleaner system, measured at the air intake hose of 2½ inch diameter, is approximately 115 CFM.

Importantly, the increased air flow has reduced the vacuum in the tank of the cleaner by only approximately 10%, i.e., from 55 inches of water down to 50 inches of water. This is not much of a decrease in vacuum as compared to the increase in total CFM, i.e., from 100 to 125 CFM. In a vacuum cleaner, it is the amount of air flowing which moves the larger particles and pieces of debris. The vacuum in the tank provides suction for drawing dirt and debris from a carpet or the like. The vacuum cleaner of the present invention is ideally suited for picking up small rocks, ball bearings, and the like which are found on the floors of garages and shops. As an example, the vacuum cleaner of the present invention will pick up a penny from a smooth concrete floor.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 is a perspective view of a vacuum cleaner in accordance with the present invention;

FIG. 2 is a fragmentary and enlarged sectional view taken generally along the line 2—2 in FIG. 1; and FIG. 3 is a fragmentary sectional view showing the discharge port and the shield which directs the air toward the discharge port.

Referring now particularly to the drawings, it will be seen that there is illustrated a vacuum cleaner 10 of the upright tank-type comprising a tank 12 supported on feet 14 and casters 16. The tank 12 may be a generally cylindrical tank, the upper end of which is open to provide a peripherally extending upper edge 20 lying in a generally horizontal plane. In the illustrative and preferred embodiment, the upper edge portion of the tank 12 is also provided with a peripherally and outwardly extending channel section or trough section 22 which is formed to provide a peripherally and downwardly extending edge portion 24 used in fastening the vacuum cleaner together. Particularly, the illustrative cleaner 10 includes a housing cover or shroud 28 which preferably is plastic and which is formed with depending clips 30 which engage the edge portion 24.

Then, a hood 32 having a portion 34 on which the electrical service cord may be wrapped is mounted upon the cover 28. Beneath the cover 28 is a blower assembly 38 comprising a motor 40 which may be an approximately one horsepower peak motor and having a shaft speed of 20,000 to 25,000 RPM. The motor provides a shaft 42 upon which a blower wheel 44 is mounted, the blower wheel including an upper disc 46, a lower disc 48 and blades 50 extending between the two discs. The lower disc 48 provides a concentric inlet opening 52. The blower wheel 44 of the illustrative embodiment is a backwardly curved centrifugal blower wheel with the center opening 52 such that, when the wheel is driven, air is drawn into the concentric opening as indicated by the arrow 56 and expelled radially outwardly from the space between the discs 46, 48 as indicated by the arrows 58. With the one horsepower motor 40, such a blower wheel capable of delivering 125 CFM at full speed with an unobstructed inlet may be used to provide advantageous results as discussed previously.

The blower assembly 38 includes a blower housing 60 providing an interior space 62 in which the blower wheel 44 is disposed. The housing includes a lower, circular wall 64 having a concentric opening 66 therein which is in registry with and of the same general size as the opening 52 in the bottom disc 48 of the blower wheel 44. The sectional view of FIG. 2 of the illustrative embodiment shows that the lower wall 64 has three concentric levels including the lowermost center level 68, intermediate level 70 and upper level 72. The lower disc of the blower wheel 44 is illustrated as being received in the center level 68. Forming the lower wall 64 in this manner gives it strength. Then, the outer peripheral edge portion of the lower wall 64 is formed to include a raised portion 74, the radial cross section of which includes an upwardly extending wall section 76, a horizontally outwardly extending wall section 78 and a downwardly extending wall section 80. The raised portion 74, therefore, provides a channel section receiving a gasket 82 which engages and seals the opening 20 of the tank 12.

The lower wall 64 of the housing 60 is fastened to its upper wall 86 by means such as the illustrated screw 88 which threadedly engages the downwardly extending stud 90 on the upper wall. It will be appreciated that a sufficient number such as four or six of such fastening means may be used to fasten the lower wall 64 to the upper wall 86. To complete the assembly, the cover 28 may be rigidly fastened to the upper wall 86 by means such as the illustrative screw 92 which threadedly engages the upwardly extending stud 94. Again, a sufficient number such as four of such fastening means may be used to secure the cover 28 to the upper wall 86. Thus, when the clips 30 are loosened, the entire upper portion of the vacuum cleaner 10 may be removed from the tank 12 simply by lifting upwardly on the cover 28 or even upon the hood 32 mounted upon the cover.

The upper wall 86, which may be molded from plastic as illustrated, is designed to support the motor 40 and to provide an opening 98 through which the shaft 42 of the motor extends downwardly. Of course, the upper wall 86 will be formed with sufficient strengthening ribs and, in the illustrative embodiment, it is formed to have a peripherally extending major portion 100 which extends radially outwardly and upwardly and which terminates with a peripherally extending minor portion 102 extending radially outwardly and downwardly. The outermost peripheral portion 104 of the upper wall 86 is in vertical registry with the raised portion 74 and formed to provide a vent space so that air can flow above the raised portion 74 and particularly above its upper section 78. That is, air can flow from the interior space 62 over and above the raised portion 74 to be vented from the interior space. In the illustrative and preferred embodiment, this outer peripheral portion 104 is provided with a plurality of radially outwardly and downwardly extending ribs 106 which are peripherally narrow and which rest upon the upper section 78 of the raised portion 74 of the lower wall 64. The axial depth (vertical depth) of these ribs may be, for instance, 0.050 inch. In the 15 inch diameter system previously described, there may be 26 such ribs equally peripherally spaced about the upper wall 86 with the peripheral width of each rib being approximately 0.1 inch to 0.125 inch. Thus, the bleed-off vents extend substantially the entire distance about the outer periphery of the blower housing 60. The axial depth of the vents is significantly less than the axial depth of the interior space 62 or, for that matter, the spacing between the upper and lower discs 46, 48 of the blower wheel.

The upper wall 86 is provided with a raised portion 118 defining an interior space 120 and, on that raised portion, an upwardly extending ferrule 122 providing a discharge port 124. The ferrule 122 extends through an opening 126 in the cover 28. The ferrule 122 is proportioned and designed such that the hose of the vacuum cleaner may be connected to the ferrule to receive the air being discharged therethrough. Also, a grillwork 128 is formed as a screen to prevent objects from flying out through the port 124. It will be appreciated that the port 124 and the raised portion 118 are positioned radially inwardly from the outer peripheral edge portion 104 providing the bleed-off vent spaces discussed previously. In order to have a portion of the air being expelled radially outwardly from the blower wheel 44 move through the port 124, the upper wall 86 provides a depending, generally U-shaped shield 130 having leg sections 132, 134 extending toward the outer periphery of the blower wheel 44 and a central section 136 extending about the radially outer peripheral portion of the discharge port or, more particularly, the raised portion 118 providing the discharge port. As viewed in FIG. 3, the distal portion of the leg section 134 may also extend a short distance clockwise (looking down FIG. 3) to shield a ferrule 140 provided by the upper wall 86. This ferrule 140 which is in registry with an opening (not shown) in the lower wall provides an intake port for the tank 12. Particularly, the hose 142 is placed in the ferrule 140 when the vacuum cleaner 10 is used to pick up objects and debris, the illustrative hose 142 including a conventional fitting as indicated at 144. When it is desired to use the vacuum cleaner for blowing purposes, the hose is connected to the discharge port 124.

The vacuum cleaner just described will out-perform a much larger conventional vacuum cleaner including a 1¼ horsepower motor and a 2-stage blower wheel with each stage being of the same dimensions and characteristics as the blower wheel 44.

The vacuum cleaner design just described provides a small, compact vacuum cleaner which will pick up larger pieces of debris such as ball bearings, metal clips, rocks and the like with the only limit upon the size of such pieces being the internal diameter of the hose 142. Importantly, the design just described provides a vacuum cleaner with improved pickup capacity as well as with a substantial blowing capacity without the provision of any type of mechanism for opening and closing vent valves, reducing passageways, and the like. In other words, when converting the vacuum cleaner 10 from a pickup operation to a blowing operation, it is not necessary for the operator to open or close vent valves or to use an adapter for the hose 142, which adapter will increase or reduce the cross sectional area of the discharge path.

What is claimed is:

1. A vacuum cleaner having a blower feature as well as a pickup feature, said cleaner comprising a tank having an interior space for receiving dirt and debris, a blower assembly mounted on said tank, said assembly comprising a housing defining an interior space in communication with the interior space of said tank through an inlet passage, and motor-driven blower means for moving air from said tank through said inlet passage into said housing, said housing providing a discharge port for its said interior space proportioned and constructed such that a blower hose can be connected thereto, and said housing providing discharge vents for its said interior space, said discharge vents being in addition to and separate from said discharge port, said housing being devoid of valve means between said discharge vents and discharge port such that said vents and port are always in communication and open, said tank being generally cylindrically shaped and upright with said blower housing being generally coaxially mounted on said tank, said housing being axially relatively shallow and constructed to provide upper and lower, generally radially outwardly extending circular walls, with said discharge port in said upper wall, said inlet passage in said lower wall and said discharge vents between the outer peripheral edges of said walls, and said blower means being disposed between said upper and lower walls to direct the air radially outwardly toward said discharge vents.

2. The invention of claim 1 in which the outer peripheral edge portion of at least one of said walls is formed such that the axial depth of said vents is less than the depth of the interior space of said housing.

3. The invention of claim 2 in which said blower means includes an axially short blower wheel disposed coaxially in said housing between said walls, said blower wheel being disposed to expel air radially outwardly from its periphery, said inlet passage being a circular passage located in said lower wall coaxially with said blower wheel, said vents extending substantially about the full periphery of said housing.

4. The invention of claim 3 in which said discharge port is positioned radially inwardly from the outer peripheral edge of said upper wall.

5. The invention of claim 4 in which said upper wall provides a depending, generally U-shaped shield having leg portions extending toward the outer periphery of said blower wheel and a central portion extending about the outer periphery of the radially outer portion of said discharge port, said shield being effective to direct a portion of the air leaving said blower wheel to said discharge port.

6. A vacuum cleaner comprising a tank providing an interior space for collecting dust and debris, a blower assembly mounted on said tank, said blower assembly including a housing providing an interior space, an inlet port and a discharge port, a blower disposed in said housing, and a motor for driving said blower, said inlet port providing communication between the interior space of said tank and the interior space of said housing, said housing being constructed, at said discharge port, such that a hose can be connected to said discharge port to be used for blowing purposes when said blower is driven, said housing also providing, in addition to and separate from said discharge port, bleed-off vents for its said interior space, said bleed-off vents being proportioned to bleed off from approximately 60 to 80% of the air drawn through said inlet port, said blower assembly being devoid of valve means between said discharge port and said bleed-off vents such that said port and vents are in open communication, said tank being an upright tank providing, at its upper extent, a circular opening, said housing being mounted on said tank to close said circular opening, said housing including a lower, circular wall covering said tank opening and an upper wall cooperating with said lower wall to define the interior space of said housing, said lower wall having a concentrically located opening therein providing said inlet port, said blower including an axially short blower wheel disposed in said interior space and including lower and upper axially spaced apart circular discs with blade elements extending therebetween, said lower disc being adjacent said lower wall and providing a concentric opening registering with said inlet port, said blade elements being constructed to draw air into the center opening of said lower disc to expel the air radially outwardly from said blower wheel, the outer peripheral edges of said upper and lower wall cooperating to define axially short, peripherally elongated openings therebetween serving as said bleed-off vents disposed generally radially outwardly from the axial space between said blower wheel discs.

7. The invention of claim 6 in which said bleed-off vents are disposed substantially about the full periphery of said housing.

8. The invention of claim 7 in which said lower wall is provided with a raised portion extending about its outer peripheral edge to define an upper surface, said upper wall being provided with a plurality of peripherally spaced apart, downwardly and radially outwardly extending ribs resting on said upper surface to define said bleed-off vents therebetween.

9. The invention of claim 8 in which the axial depth of said vents is substantially less than the axial depth of the space between said walls.

10. The invention of claim 6 in which said upper wall is formed to provide said discharge port, said port being positioned radially inwardly from the outer peripheral edge of said upper wall.

11. The invention of claim 10 in which said upper wall provides a depending, generally U-shaped shield having leg portions extending toward the outer periphery of said blower wheel and a central portion extending about the outer periphery of the radially outer portion of said discharge port, said shield being effective to direct a portion of the air leaving said blower wheel to said discharge port.

12. The invention of claim 3 in which the diameter of said blower housing is approximately three times the diameter of said blower wheel, such that said bleed-off vents are spaced relatively a considerable distance from the outer diameter of said blower wheel.

13. The invention of claim 1 in which said blower means includes an axially short centrifugal blower wheel disposed coaxially in said housing between said walls to expel air radially outwardly toward said vents, the diameter of said housing being approximately three times the diameter of said blower wheel.

14. The invention of claim 6 in which the diameter of said housing is approximately three times the diameter of said blower wheel.

* * * * *